United States Patent
Sofman et al.

[19]

[11] Patent Number: 5,946,295

[45] Date of Patent: Aug. 31, 1999

[54] METHOD OF ROUTING AND MULTIPLEXING DEMANDS IN A TELECOMMUNICATIONS NETWORK

[75] Inventors: Lev B. Sofman; Sridhar S. Nathan, both of Plano, Tex.

[73] Assignee: MCI Communications Corporation, Washington, D.C.

[21] Appl. No.: 08/863,050

[22] Filed: May 23, 1997

[51] Int. Cl.⁶ .......................... H04L 12/24; H04Q 11/04

[52] U.S. Cl. ..................... 370/228; 370/238; 370/254; 340/827; 395/200.69; 395/200.7; 395/200.71

[58] Field of Search ................... 370/216, 225, 370/228, 229, 230, 231, 235, 236, 237, 238, 252, 254, 255, 351, 400, 539, 541; 340/825.01, 825.03, 826, 827; 395/181, 182.01, 182.02, 200.64, 200.65, 200.68, 200.69, 200.7, 200.71, 200.72, 500

[56] References Cited

U.S. PATENT DOCUMENTS

| | | | |
|---|---|---|---|
| 5,515,367 | 5/1996 | Cox, Jr. et al. | 370/409 |
| 5,564,021 | 10/1996 | Qiu et al. | 370/431 |
| 5,657,142 | 8/1997 | Fahim | 370/238 |
| 5,729,692 | 3/1998 | Qiu et al. | 395/200.71 |
| 5,787,271 | 7/1998 | Box et al. | 395/500 |

*Primary Examiner*—Alpus H. Hsu

[57] ABSTRACT

A method of routing lower multiplex level demands in a telecommunications network including a plurality of interconnected nodes to form higher multiplex level demand-routes. The method defines an initial lower multiplex level demand-route for each pair of nodes of the network. The initial lower multiplex level demand-route carries all lower multiplex level demands originating or terminating at a node of the pair. The method then splits the demand of each initial lower multiplex level demand-route between an express demand and an overflow demand and routes express demands in higher multiplex level express routes. The method patches the overflow demands into higher multiplex level routes according to a predetermined patching policy.

16 Claims, 7 Drawing Sheets

METHOD OF ROUTING AND MULTIPLEXING DEMANDS IN A TELECOMMUNICATIONS NETWORK

CROSS-REFERENCE TO RELATED APPLICATION

The present application is related to application Ser. No. 08/862,290 filed May 23, 1997, titled METHOD OF TELECOMMUNICATIONS DEMAND-ROUTE MULTIPLEXING (DEROM), with the named inventors Lev B. Sofman and Sri Nathan and assigned to the Assignee of the present Application, which is incorporated herein by reference for all purposes.

FIELD OF THE INVENTION

The present invention relates generally to communication network design and more particularly to a method of routing lower multiplex level demands in a telecommunications network to form higher multiplex level demand-routes and optimizing the network in terms of transmission and equipment cost.

DESCRIPTION OF THE PRIOR ART

Modern digital telecommunications systems are built upon a hierarchical network. The network consists of a plurality of nodes or sites that are interconnected by transmission facilities. Generally, lower bandwidth level demands are multiplexed into higher bandwidth demands. For example, up to twenty-eight 1.544 Mbps DSO channels can be multiplexed into a single 44.376 Mbps DS3 channel. Similarly, up to twelve DS3 channels can be multiplexed into a single 622.08 Mbps OC12 channel. Finally, up to sixteen OC12 channels can be multiplexed into a single 9.953 Gbps OC192 channel.

It is a goal of telecommunications network design to serve the demand at the least cost, while maintaining an acceptable level of survivability in the event of equipment failures. Two elements of cost in a network are transmission costs and equipment costs. The transmission cost is generally based on the transmission distance. An element of equipment cost is the cost per port necessary to multiplex multiple channels into a single channel. Generally, transmission costs can be minimized by multiplexing as much demand as possible into as few transmission channels as possible. However, equipment costs may be minimized by multiplexing as few channels as possible. Thus, transmission costs and equipment costs compete with each other, and optimization of a network requires tradeoffs.

Additionally, network optimization and bandwidth management are complex and difficult because many different variables and alternatives must be considered. For example, locating patching points in large networks is not an easy task. Moreover, different patching policies can affect the cost of the network. Additionally, the decision to route demands through express channels is typically based upon a threshold chosen by the network designer. The value of the threshold can affect the cost of the network.

Patching policies provide the rules for multiplexing excess demands that are not carried in express channels. Examples of patching policy alternatives are shortest route, homing to the nearest patching point, and table-driven homing. In the shortest route patching policy, patching takes place only on those patching points that are located along the shortest route, and, in the case of diversity, the second shortest route, between the origin and the destination nodes. Two versions of the shortest route patching policy are first and last, in which patching takes place only on the first and last patching points along the route, and patch everywhere, in which patching may take place at all patching points along the route. In the homing to the nearest patching point policy, patching takes place at the patching points that are closest to the origination and destination nodes of the demand. Thus patching, according to homing to the nearest patching point policy, most likely will not take place along the shortest route between the origination and destination nodes. Thus, the homing to the nearest patching point policy adds an element of diversity to the network.

In the table-driven homing patching policy, patching points are identified by means of a table. In table-driven homing to a single home, the patching site depends only on the origination node. In table-driven multiple homing, the patching point depends on both the origination and the destination nodes.

Network survivability is influenced by diversity policy. Under diversity, the demand is split between a primary route and a secondary route. While diversity may increase the survivability of the network, it also tends to increase the transmission cost for the network. Accordingly, one diversity policy is not to use diverse routing. If the network designer does desire to use diversity, then one option is proportional diversity, in which a given demand is split between a primary and a secondary route according to a ratio such as 50—50. Another option is non-proportional diversity, in which the demands are split between primary and secondary routes according to preselected thresholds.

From the foregoing, it may be seen that the process of optimizing a network, in terms of multiplexing and diversity, requires consideration of several variables and alternatives, as described above. The existing processes for optimizing networks are tedious, since different routing and patching tools are used and updates and changes in the network design, routing options, and patching policies are presently accomplished manually. Accordingly, it is an object of the present invention to provide an integrated and computationally efficient method of optimizing a telecommunications network.

SUMMARY OF THE INVENTION

The present invention provides a method of routing lower multiplex level demands in a telecommunications network including a plurality of interconnected nodes to form higher multiplex level demand-routes. The method first constructs, depending on the diversity policy implemented, either a single initial lower multiplex level demand-route, or a primary initial lower multiplex level demand-route and a diversely routed secondary initial lower multiplex level demand-route, for each pair of nodes of the network. A lower multiplex level demand-route carries, on a specified route, lower multiplex level demands originating or terminating at a node of the pair. The method then splits the demand of each initial lower multiplex level demand-route between an express demand and an overflow demand and routes express demands in higher multiplex level express routes. The method patches the overflow demands into higher multiplex level routes according to a predetermined patching policy.

The method splits the initial lower multiplex level demands according to an express parameter and a patching threshold value. The express parameter is an integer multiple of ratio between the higher multiplex level and the lower multiplex level. The patching threshold value is chosen by the network designer to optimize the network in terms of total cost. The method splits the demand of the initial lower multiplex level demand-routes by dividing the demand by the express parameter to obtain an integer multiple of the express parameter and a remainder. Whenever the remainder is equal to or greater than the threshold value, the method routes the entire demand in a higher multiplex level express demand route. Whenever the remainder is less that the threshold value, the method routes the remainder through a patching route.

The method of the present invention is preferably implemented in a computer system by creating an array of linked lists. The array comprises a linked list of demand-routes associated with each pair of nodes of the network. The method routes the express demands by updating the linked list associated with each pair of nodes with its associated express demand-route. The method patches the overflow demands by constructing an overflow route between the nodes of each pair of nodes according to the predetermined patching policy and generating a list of overflow demand-routes carrying the overflow demand for each said overflow route according to the patching policy. The method then updates the linked list associated each pair of nodes in each list of overflow demand-routes.

The method updates the linked lists by determining whether the linked list for a given pair of nodes includes as an element a route that is identical to the demand-route under consideration. Whenever the linked list includes as an element an identical route, the method adds the number of demands of the demand-route to the identical route. Whenever the linked list does not include as an element an identical route, the method appends the demand-route to said linked list.

The present invention also includes a method of optimizing a telecommunications network in terms of cost. A network designer defines optimization parameters by selecting a patching threshold value and a set of patching points in the network. The method defines an initial lower multiplex level demand-route for each pair of nodes in the network. Then, the method splits the demand of each initial lower multiplex level demand-route between an express demand and an overflow demand as a function of said selected patching threshold value. The method routes the express demands in first higher multiplex level express demand-routes and patches the overflow demands into first higher level demand-routes at patching points according to a predetermined patching policy.

Thus, the method produces a set of first higher multiplex level demand-routes made up of express routes and patched routes. The method may then calculate the cost of the network. Then, the network designer can adjust the optimization parameters and repeat the foregoing process until an optimum network in terms of cost is found.

Preferably, the first higher multiplex level demand routes are multiplexed to a second or higher multiplex level, either by repeating the process of the present invention or by the method of co-pending application Ser. No. 08/862,290, (Attorney Docket No. RIC-96-052 (20350.00015)), filed on even date herewith, titled METHOD OF TELECOMMUNICATIONS DEMAND-ROUTE MULTIPLEXING (DEROM), and assigned to the Assignee of the present Application, the disclosure of which is incorporated by reference herein for all purposes.

DESCRIPTION OF THE PREFERRED EMBODIMENT

Figure 1:
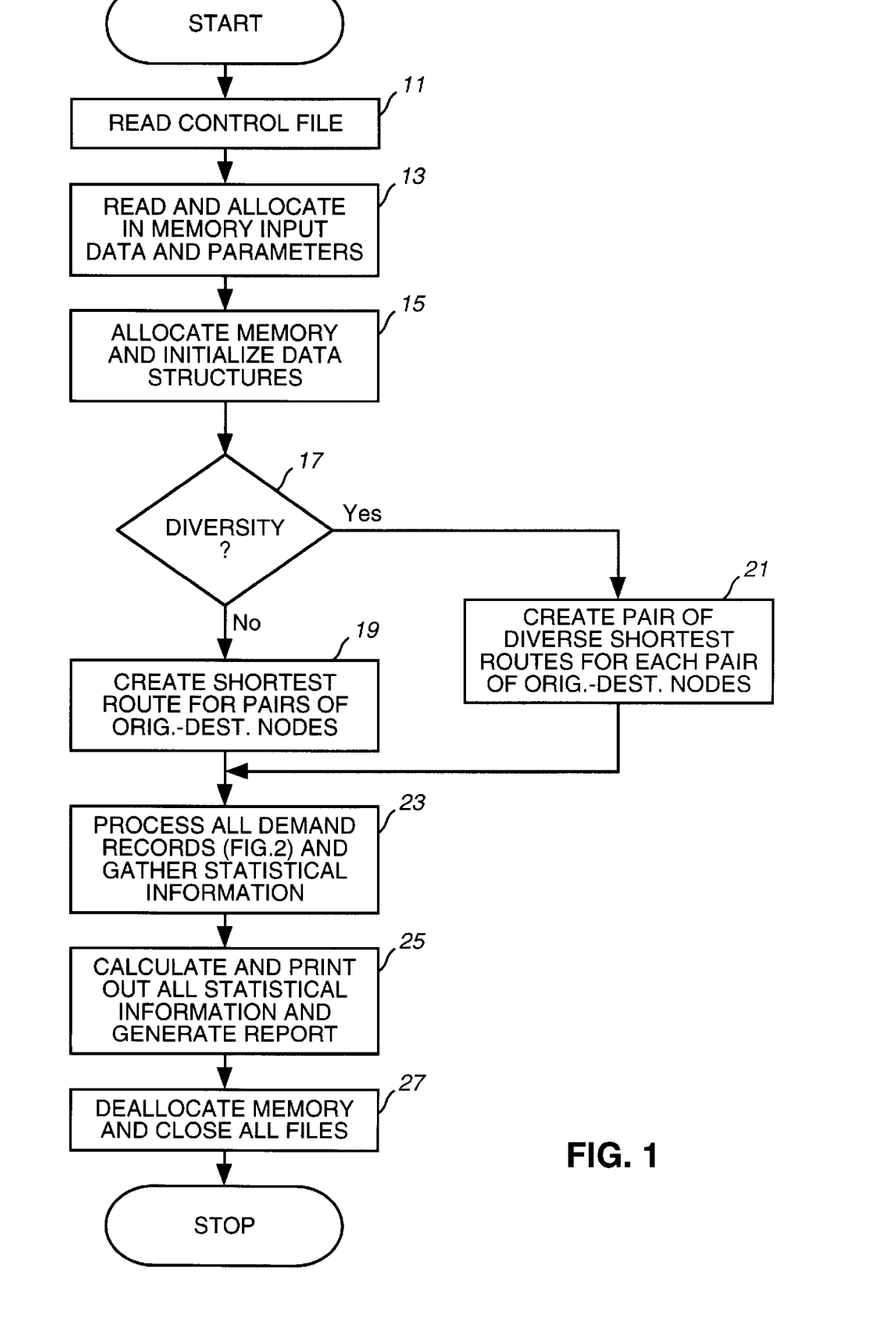
FIG. 1 is a flowchart a preferred embodiment of the bandwidth management process of the present invention.

Referring now to the drawings, and first to FIG. 1, there is shown a flowchart of the bandwidth management process of the present invention, which is implemented in a computer system. The process starts at block 11, in which the system reads the control file. The control file includes names of all input and output data and parameter values.

At block 13, the system reads and allocates in memory the input data and parameters. The input data includes the network topology, including the nodes of the network, the spans, and any alias information.

In a network, there are site nodes and switch nodes. Every switch node is co-located with some site node, and several switches can be located at the same site. Aliases represent the information about co-located nodes, for example switches located at the same site.

Each record in the aliases file has two fields, i.e., node name and alias name. A unique numerical index is assigned to each node. All input data is stored and processed in terms of node indices. The system can translate back and forth between a node name and a node index.

Span data identifies all links, which are lines connecting pairs of site nodes, together with the length or mileage and cost of the link. The process of the present invention uses cost of the links in building the shortest route between nodes. The process uses length of the links to calculate total mileage for the route for statistical purposes.

The input data also includes demand data, which is the number of low multiplex level demands for each origination-destination node pair in the network. Thus, the system of the present invention starts with lower multiplex level demands, rather than lower multiplex level demand-routes, as in co-pending application Ser. No. 08/862,290. The process of the present invention builds and outputs higher multiplex level demand-routes. Accordingly, the input data also includes patching information, including patching policy or type, and a list of patching points in the network. The input data also includes diversity information, including diversity type, and depending on the type, percentages, thresholds, or routing tables, and routing rules that limit the length of secondary routes. The input data also includes multiplexing information, including lower multiplex level, higher multiplex level, and the multiplex level ratio. The multiplex information also includes an express parameter, which is an integer multiple of the multiplex level ratio, and a bundling threshold.

After the input data and parameters have been read, the system allocates memory and initializes the data structures at block 15. The primary data structure in the process of the present invention is an array of linked lists of demand-routes. The array of linked lists is a one-dimensional array, or vector, of pairs of nodes in the network. In the present invention, A-B and B-A are counted as a single node pair. Thus, in a network of N nodes, the array will have P=N*(N−1)/2 elements.

For every element in the array, there is a linked list of demand-routes. A demand-route is a route from one end node to another end node via any intermediate nodes and the number of demands carried over that route. According to the present invention, an end node may be an origination node or a destination node, or a patching point node. Initially, the linked list for each element of the array is empty.

After the system has allocated memory and initialized the data structures, the system tests for diversity at decision block 17. In the preferred embodiment, diversity is set by means of a diversity flag. If the flag is set to 0, which indicates no diversity, then the process creates one shortest route between each origination and destination pair of the network at block 19. If the diversity flag is set to 1 or 2, then the system creates a pair of diverse shortest routes between each pair of origination and destination nodes, at block 21. The shorter of the two routes is referred to as the primary route, and the other is referred to as the secondary route.

One method of creating two diverse uses shortest routes uses the well-known Dijkstra algorithm. First, the system constructs a primary route as the shortest route between the origination-destination pair under consideration. Then, the system temporarily removes from the network all spans that have been used in constructing the shortest route. The system then constructs a secondary route from the remaining spans as the shortest route between the origination-destination pair. Finally, the system replaces in the network all spans that were temporarily removed. Of course, there are other algorithms, well known to those skilled in the art, for constructing diverse shortest routes.

After the system has created either one shortest route or a pair of diverse shortest routes for each pair of origination-destination nodes, the system processes all the demand records, as will be discussed in detail with respect to FIGS. 2–4 and gathers statistical information at block 23.

The statistical information includes such information as an output demand file, which is a list of high multiplex level demands. The statistical information also includes an output demand-route file, which includes low multiplex level demands and high multiplex level demands with routes, cost, and distances. Then, at block 25, the system calculates and prints out all statistical information and generates a report. The network designer can use the report in optimizing the network. Finally, the system de-allocates memory and closes all files at block 27.

Figure 2:
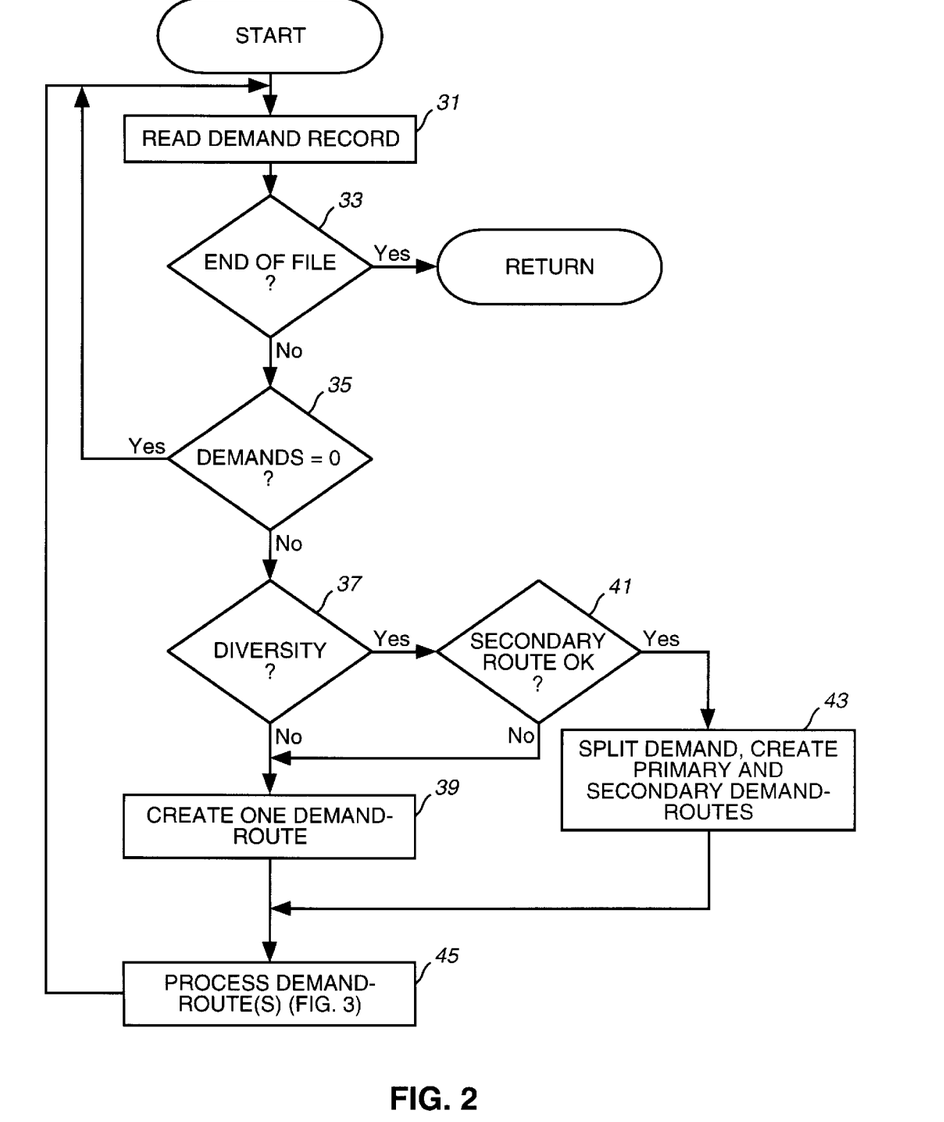
FIG. 2 is a flowchart showing demand record processing according to the bandwidth management process of the present invention.

Referring now to FIG. 2, there is shown a flowchart of the method of processing demand records (block 23 of FIG. 1). First, the system reads a demand record at block 31. The demand file can include several records with identical or co-located origination-destination pairs. Then, the system tests at decision block 33 whether or not the process is at the end of the demand record file. If not, the system tests at decision block 35 whether or not the number of demands equals 0. If so, the system returns to block 31 to read the next demand record. If the number of demands is not equal to 0, then the system tests at decision block 37 for diversity. If the diversity flag is set equal to 0, then the system creates one initial demand-route at block 39. If, at decision block 37, the diversity flag is not set equal to 0, then the system tests at decision block 41 whether or not the secondary route is allowed under the routing rules set for the network. More specifically, the system of the present invention uses routing rules to justify the use of secondary routes by avoiding using excessively long secondary routes.

The routing rules give an upper limit of secondary route length S as a function F(P) of the primary route length P for a given origination-destination pair. In cases where diversity is required, the routing rules allow the use of a secondary route between the origination node and the destination node only if S is less than or equal to F(P). If S is greater than F(P), the routing rules will not allow the secondary route.

The function F(P) can be represented by an analytical expression, a table, or by any other appropriate method. The preferred embodiment of the present invention uses a combination of table and analytical expression to present the function F. The table is illustrated in the following Table 1:

| SPMR | SM | M |
| --- | --- | --- |
| 0 | 500 | 99999 |
| 100 | 2000 | 5 |
| 500 | 3000 | 4 |
| 1000 | 5000 | 3 |
| 2000 | 6500 | 2 |
| 6500 | 6500 | 99999 |

The columns of Table 1 are start point of the mileage range (SPMR), maximum secondary mileage (SM), and multiplier (M). SPMR increases monotonically from 0 to a maximum value that represents the length of the longest possible route, which in the preferred embodiment is 6,500 miles.

To identify the length F(P) of the longest possible secondary route for a given length P of the primary route, the process of the present invention first selects the last record in the table in which SPMR is less than P and takes SM and M from the selected record. Then, the process calculates F(P) as follows: F(P)=min (P*M, SM), if M<99999, F(P)= SM, if M=99999. For example, if P=50, the process selects the first record (SPMR=0, SM=500, M=99999). Since M=99999, F(50)=500. Accordingly, the longest allowable secondary route for a primary route of 50 miles is 500 miles. As another example, if P=600, then the process selects the third record (SPMR=500, SM=3000, M=4). Accordingly, F(600)=the lesser of 600×4 (2,400) or 3,000. Accordingly, the maximum allowable secondary length for a primary route of 600 miles is 2,400 miles.

If, at decision block 41, the secondary route is allowed, then the process splits the demand according to the value of the diversity flag and creates a primary and a secondary demand-route, at block 43. If the diversity flag is set to 1, which indicates proportional diversity, the demands will be split between the primary and secondary routes in a predefined proportion, which in the preferred embodiment is 50—50. If the diversity flag is set to 2, which indicates non-proportional diversity, the method splits the demands between the primary and secondary routes according to predetermined diversity threshold values DT1 and DT2. If the total demand D is greater than DT1, then the process routes D–DT2 demands on the primary route and DT2 demands on the secondary route. If the total demand D is equal to or less than DT1, then the system routes all demand D on the primary route. After the process has created one initial demand-route at block 39 or an initial primary demand-route and an initial secondary-demand route at block 43, the system processes the demand-route or routes according to FIG. 3 processing, as indicated generally at block 45 and returns to block 31 to read the next demand record.

Figure 3:
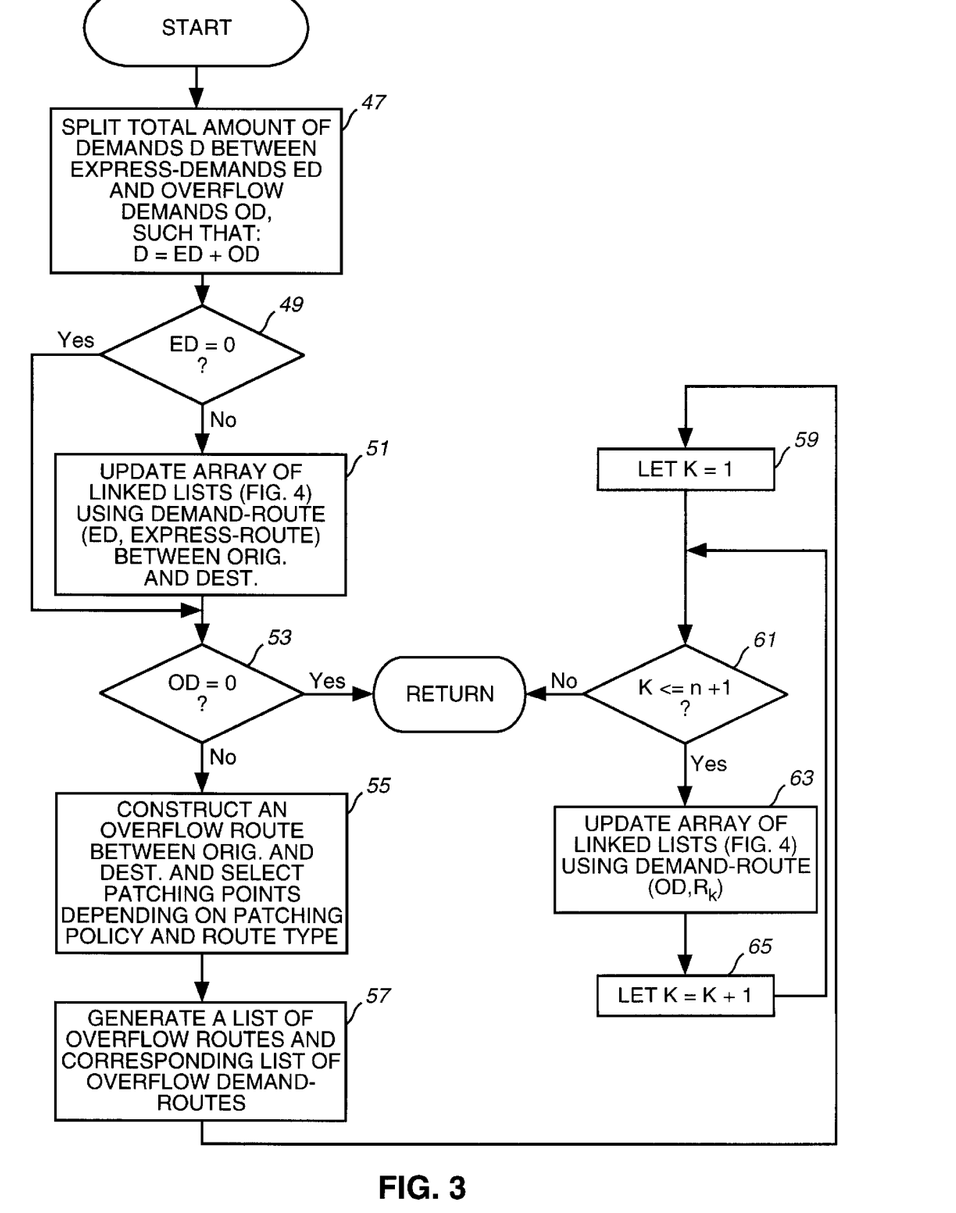
FIG. 3 is a flowchart showing demand-route processing according to the bandwidth management process of the present invention.

Referring now to FIG. 3, for each demand-route, the process splits the total amount of demands D between express demands ED and overflow demands OD such that D=ED+OD, at block 47. In the preferred embodiment, the process splits the demands D between express demands ED and overflow demands OD according to an express parameter EP and a threshold T. More specifically, the process lets D=n*EP+r, where n and r are integers and r is equal to or greater than 0 and less than EP. If r is greater than or less than T, then the process routes the entire demand through an express route, i.e., ED=D and OD=0. If r is less than T, then the process routes n*EP demands through an express route and patches the remaining demands in an overflow route, i.e., ED=n*EP, OD=r.

Usually, but not necessarily, the express parameter EP is equal to the multiplex level ratio. However, in certain instances, the network designer may select the express parameter EP to be equal to an integer multiple of the multiplex level ratio.

After the system has split the demands for the demand route between express demands and overflow demands, the system tests at decision block 49 whether or not the number of express demands ED equals 0. If not, the process updates the array of linked lists, in the manner to be explained in detail with respect to FIG. 4, using the demand-route (ED, express-route) between the origination and the destination nodes, at block 51. Then, the system tests, at decision block 53, whether the overflow demand OD is equal to 0. If so, processing returns to block 31 of FIG. 2 to read the next demand record. If, at decision block 53, the number of overflow demands OD is not equal to 0, then the process constructs an overflow route between the origination and the destination and selects patching points depending on the patching policy and the route type, at block 55.

The construction of the overflow route and selection of patching points depend on the patching policy selected by the network designer. Generally, patching policies can be characterized either as shortest route patching policies or homing patching policies. Shortest route patching policies include first and last patching and patch-everywhere policies. Homing patching policies include homing to a nearest home and table-driven homing. In the present invention, the patching policy is identified by a PATCHTYPE parameter in the control file. The possible values of the PATCHTYPE parameter are 0 (first and last), 1 (patch everywhere), 2 (homing to a nearest home), 3 (table-driven homing), and 4 (table-driven homing (multiple homes)).

In the case of shortest route patching policies, an overflow route takes the same route as an express route, which may be either a primary route or a secondary route, in the case of diversity. The process of the present invention selects as patching points some nodes along the route that belong to the list of patching nodes and the control file. The selection of patching nodes along the route is determined by the patching policy, which for shortest route patching is either first and last or patch everywhere.

In first and last patching, patching occurs only at the first and last patching points along the route. In patching everywhere, patching may occur at any patching point along the route. For example, the shortest route through a network from origination node A to destination node E by way of intermediate nodes B, C, and D may be represented as A-B-C-D-E. If B, C, and D are all patching points, and the system implements first and last patching, then overflow demands that originate at node A and terminate at node E may be patched with demands associated with other origination and destination nodes only at patching nodes B and D. If, however, the system implements patch-everywhere home patching policy, then demands originating at node A and terminating at node E may be patched with demands associated with other origination-destination node pairs at patching point C, in addition to patching points B and D.

In homing patching policies, the present invention identifies patching or homing points and then builds an overflow route. Usually, there are two patching or homing nodes, i.e., home of origination (HO) and home of destination (HD). However, in some cases there may be only one patching or homing node, as for example when HO =HD or HO=O or HD=D.

The preferred embodiment of the present invention uses one of three methods to select a homing node. In the case of homing to the nearest home policy, the present invention homes the origination node and the destination node to their respective nearest patching node. In the case of table-driven homing policy, the present invention selects the patching point from a table that assigns patching nodes based on origination and/or destination nodes. After the process of the present invention has found home nodes HO and HD, it can build an overflow route O-HO-HD-D. This route has three patching segments, O-HO, HO-HD, and HD-D.

After the present invention has constructed the overflow route and selected the patching points, at block 55, the system generates a list of overflow routes and corresponding lists of overflow demand-routes, at block 57. For example, if R is an overflow route constructed according to block 55 and $P_1, P_2, \ldots P_n$ are an ordered listing of patching points on the route, then the patching points make a partition of the overflow route into n+1 patching segments or subroutes. Thus, there are subroutes of the overflow route between origination O and $P_1$, between $P_1$ and $P_2, \ldots$ and between $P_n$ and destination D. These patching subroutes may be denoted as $R_1, R_2, \ldots R_{n+1}$.

In the above example of an overflow route from origination node A to destination node E via nodes B, C, and D, if first and last patching policy is implemented, then three patching subroutes (A-B, B-C-D, and D-E) result. If, on the other hand, patching-everywhere policy is implemented, then four patching subroutes (A-B, B-C, C-D, and D-E) result.

After the system has generated the list of overflow routes and demand-routes, at block 57, the system updates the array of linked lists with each overflow demand-route (OD, $R_k$). First, the system lets K=1, at block 59. Then, the system tests whether not K is equal to or less than n+1, at decision block 61. If so, the system updates the array of linked lists, according to FIG. 4 processing, using overflow demand-route (OD, $R_k$), at block 63. Then, the system lets K=K+1 and returns to decision block 61 for another iteration.

Figure 4:
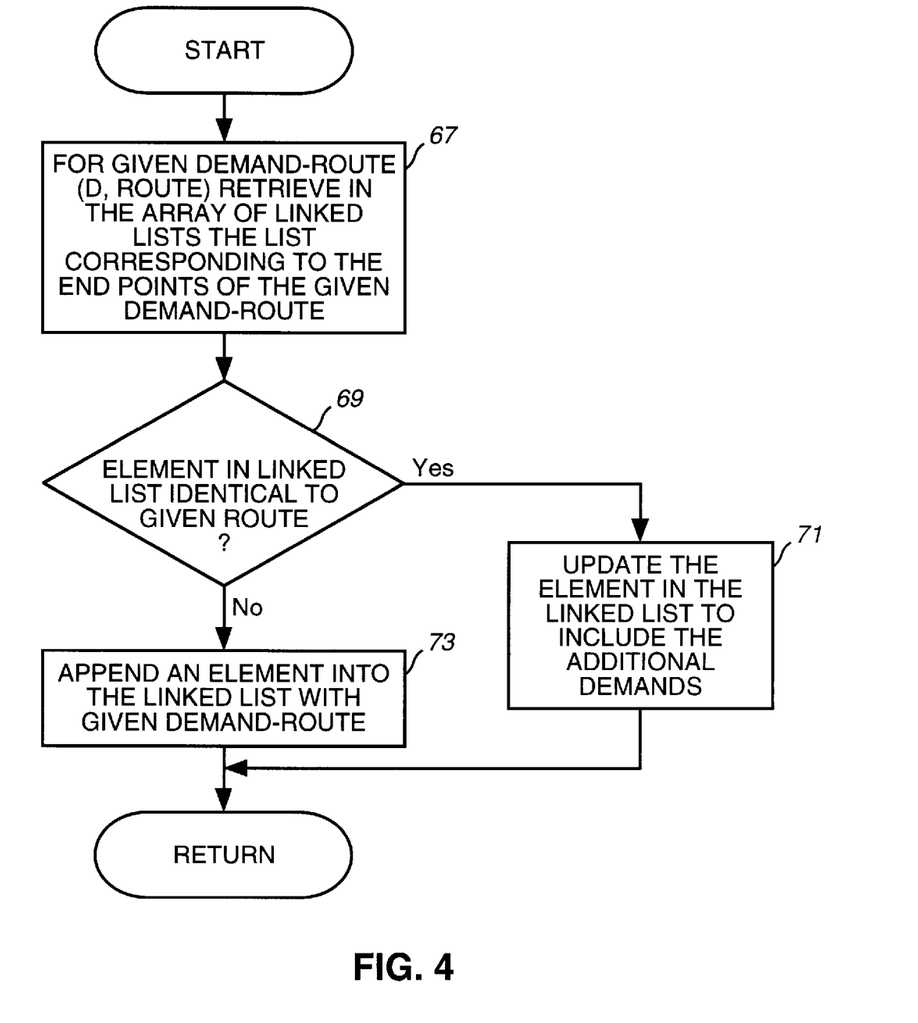
FIG. 4 is a flowchart showing linked list updating according to the bandwidth management process of the present invention.

Referring now to FIG. 4, there is shown a flowchart of the processing involved in updating the array of linked lists. For a given demand-route (D, route), the system retrieves in the array of linked lists the list corresponding to the end points of the given demand-route, at block 67. It will be recalled that the array of linked lists includes a linked list for each pair of nodes in the network. When the process of the present invention is complete, the linked list for each pair of nodes of the array will include all demand-routes having the nodes of the pair as its end points.

After the system has retrieved the list corresponding to the end points of the given demand-route, the system tests, at decision block 69, whether or not an element in the retrieved linked list is identical to the given route. Two routes are identical if they include the same nodes in the same order. If there is an element in the linked list that is identical to the given route, then the system updates the element in the linked list to include the additional demands of the given route, at block 71. If, on the other hand, there is no element in the linked list that is identical to the given route, then the system appends the given demand-route as an element into the linked list, at block 73.

Figure 6:
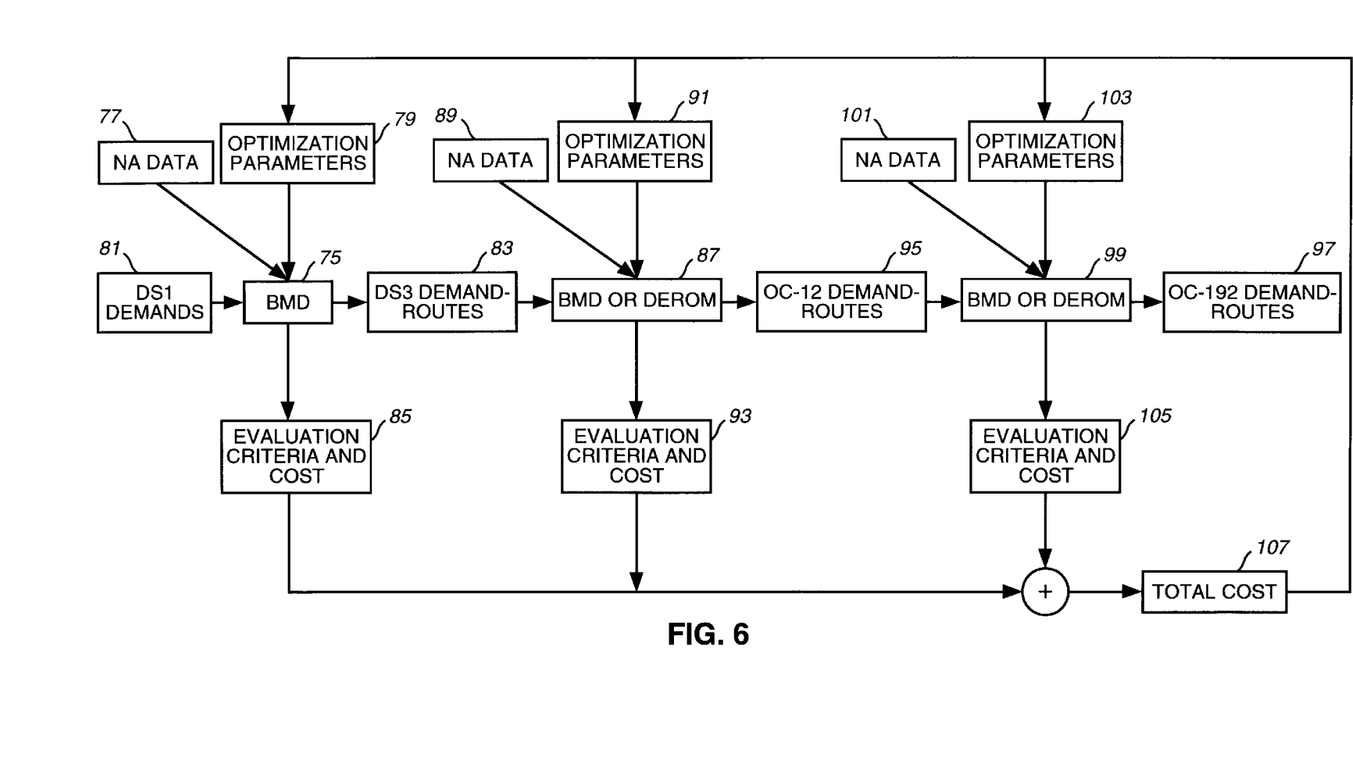
FIG. 6 is a functional block diagram of the network optimization process of the present invention.
Figure 7:
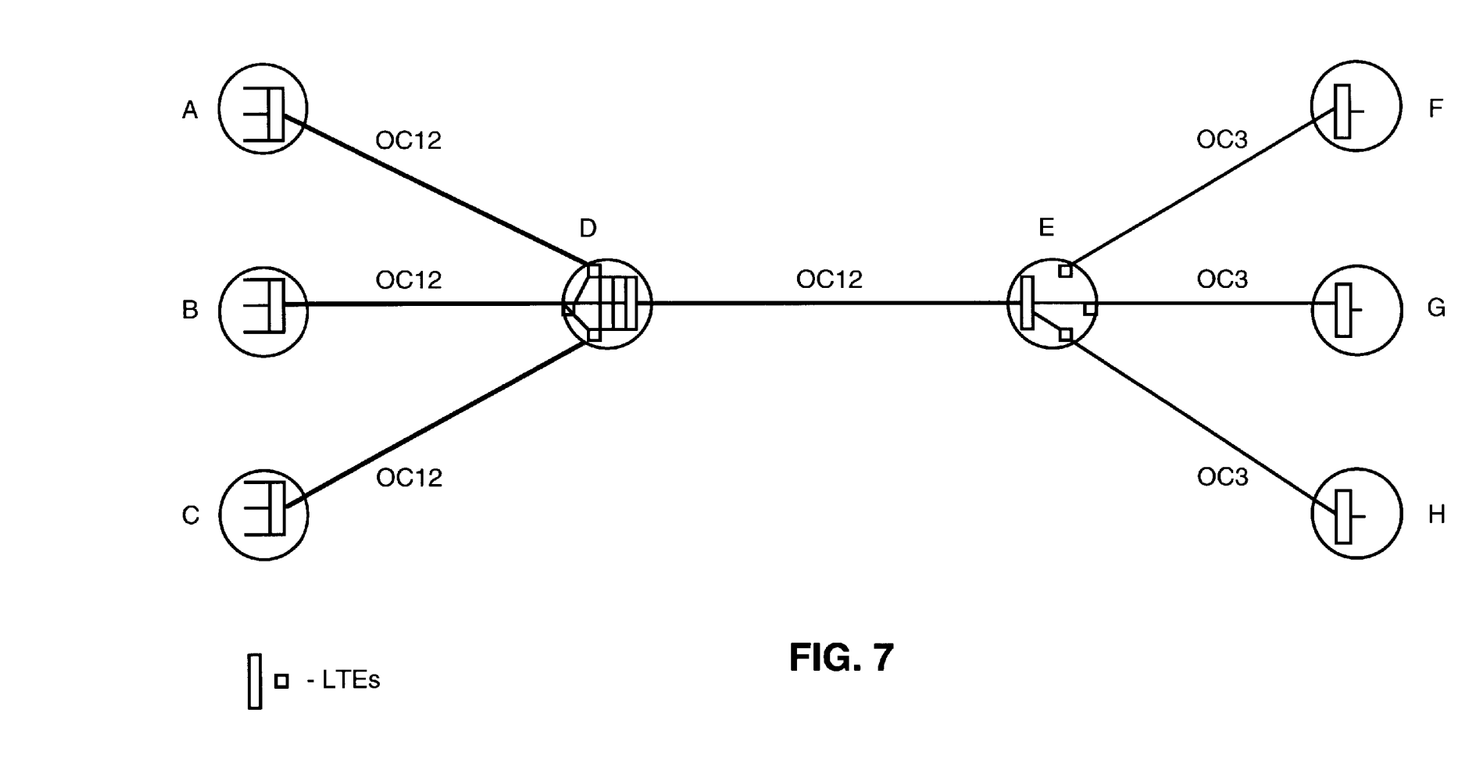
FIG. 7 shows a sample embodiment of the present invention within a telecommunications network wherein low level demand routes are multiplexed with high level demand routes, such as an OC3 to OC12 multiplexing of path A-D-E-F.

Referring now to FIG. 6, there is shown a functional block diagram illustrating an example of routing an initial set of DS1 demands and multiplexing those demands up to the OC192 level according to the optimization method of the present invention. The routing and multiplexing process of the present invention is referred to in FIG. 6 as bandwidth management dimensioning (BMD) and is functionally illustrated in FIG. 6 at block 75.

As explained in detail above, BMD 75 receives as inputs network architecture data 77, optimization parameters 79, and a set of initial DS1 demands 81. According to the present invention, the optimization parameters include and the list of patching points. The network designer can change the optimization parameters in order to optimize the network.

As set forth above, BMD 75 outputs a set of DS3 demand routes and the cost of the DS3 demand-route configuration at block 85. The DS3 demand-routes 83 form the input to a process for forming OC12 demand-routes, either by BMD or demand-route multiplexing (DEROM) as disclosed in co-pending Ser. No. 08/862,290, at block 87. The choice of BMD or DEROM at block 87 depends upon whether or not the network designer desires to preserve and bundle the DS3 demand-routes. Again, BMD or DEROM 87 receives as inputs in addition to DS 3 demand-routes 83, network architecture data 89 and optimization parameters 91. Similarly, BMD or DEROM 87 produces as outputs evaluation criteria and costs at block 93 and a set of OC 12 demand-routes at block 95.

Finally, the system forms a set of OC 192 demand-routes at block 97, either by BMD or DEROM at block 99. Again, network architecture data 101 and optimization parameters 103 are used to produce the OC 192 demand-routes 97 and a set of evaluation criteria and costs at block 105. The costs outputted at blocks 85, 93, and 105 are summed to form a total cost at block 107. The network designer can use the evaluation criteria produced at the various iterations and the total cost in order to vary the optimization parameters in order to arrive at an optimum least cost network architecture.

Figure 5:
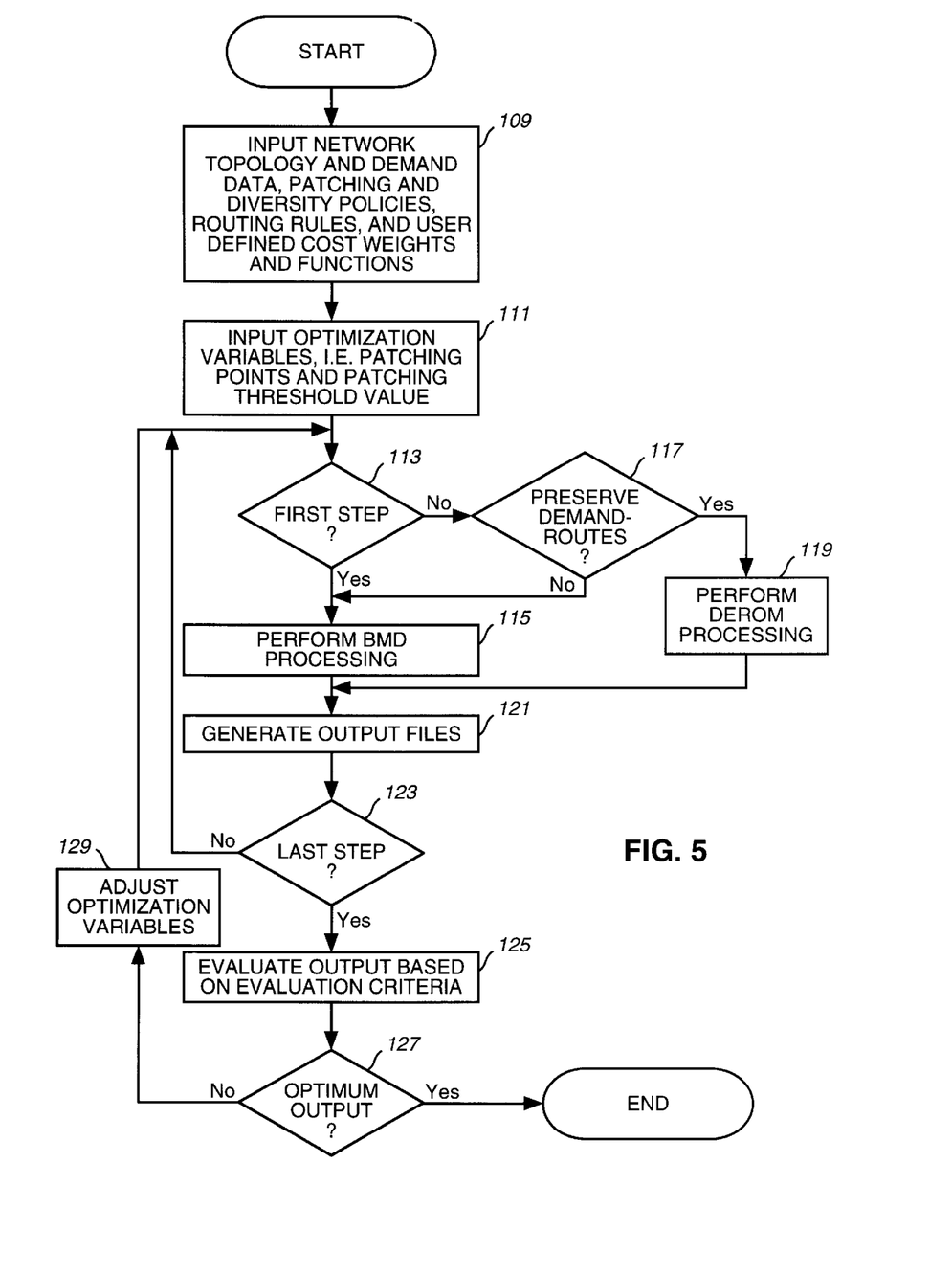
FIG. 5 is a flowchart of a preferred embodiment the network optimization process of the present invention.

Referring now to FIG. 5, there is shown a flowchart of the optimization process of FIG. 6. The input topology and demand data, as well as patching and diversity policies, routing rules, and user defined costs, weights and functions are inputted at block 109. The optimization variables or parameters, which in the present invention are the set of patching points and the patching threshold value are input at block 111. Then, the system tests, at decision block 113 whether or not it is the first step of the process. If so, the system performs BMD processing in the manner described with respect to FIGS. 1–4 above, at block 115. If, at decision block 113, it is not the first step of the process, then the system tests, at decision block 117, whether or not the network designer desires to preserve demand routes. If so, the system performs DEROM processing as described in co-pending Ser. No. 8/862,290, at block 119. If the system designer does not desire to preserve demand-routes, then the system performs BMD processing at block 115.

After the system has performed DEROM processing at block 119 or BMD processing at block 115, the system generates output files, which include a set of higher multiplex level demand routes and a set of evaluation criteria and network cost at block 121. Then, the system tests, at decision block 123 whether or not it has performed the last step, if not, the system returns to decision block 113 for another iteration. If, at decision block 123, it is the last step, then the network designer evaluates the output based upon evaluation criteria at block 125. If, in the judgment of the network designer, an optimum output has been reached, at decision block 127, the process ends. If not, the network designer can adjust the optimization variables at block 129 and repeat the process until an optimum output is achieved.

From the foregoing, it may be seen that the present invention provides tools that enable a network designer both to form hierarchical networks of demand-routes at increasing multiplex levels and to optimize the network by adjusting optimization parameters, such as patching threshold and the location of patching points.

What is claimed is:

1. A method of routing lower multiplex level demands in a telecommunications network including a plurality of interconnected nodes to form higher multiplex level demand-routes, which comprises the computer implemented steps of:

defining an initial lower multiplex level demand-route for each pair of nodes of said network, said initial lower multiplex level demand-route carrying all lower multiplex level demands originating or terminating at a node of said pair;

splitting the demand of each said initial lower multiplex level demand-route between an express demand and an overflow demand;

routing said express demands in higher multiplex level express routes between said pairs of nodes; and, patching said overflow demands into higher multiplex level routes according to a predetermined patching policy.

2. The method as claimed in claim 1, wherein said step of splitting the demand of each said lower multiplex level demand-route includes the step of including a number of demands in each said express demand equal to an integer multiple of an express parameter.

3. The method as claimed in claim 1, wherein said step of splitting the demand of each said lower multiplex level demand-route includes the step of dividing said demand by an express parameter to obtain an integer multiple of said express parameter and a remainder.

4. The method as claimed in claim 3, including the step of including in all of said demands in said express demand whenever said remainder is equal to or greater than a preselected threshold value.

5. The method as claimed in claim 3, including the step of including said remainder in said overflow demand whenever said remainder is less than a preselected threshold value.

6. The method as claimed in claim 1, including the steps of:

creating an array of linked lists, said array comprising a linked list of demand-routes associated with each pair of nodes of said network, and wherein;

said step of routing said express demands includes the step of updating the linked list associated with each pair of nodes with its associated express demand-route; and, said step of patching said overflow demands includes the steps of:

constructing an overflow route between the nodes of each pair of nodes according to said predetermined patching policy;

generating a list of overflow demand-routes carrying said overflow demand for each said overflow route according to said patching policy;

updating the linked list associated each pair of nodes in each said list of overflow demand-routes with each overflow demand-route of said list of overflow demand-routes.

7. The method as claimed in claim 6, wherein said updating steps each include the computer implemented steps of:

for a pair of nodes in said array of linked lists, determining whether the linked list for said pair of nodes includes as an element a route that is identical to said demand-route;

whenever said linked list includes as an element an identical route, adding the number of demands of said demand-route to said identical route; and, whenever said linked list does not include as an element an identical route, appending said demand-route to said linked list.

8. The method as claimed in claim 1, wherein the route of each said initial lower multiplex level demand route is a shortest route through said network.

9. A method of routing lower multiplex level demands in a telecommunications network including a plurality of interconnected nodes to form higher multiplex level demand-routes, which comprises the computer implemented steps of:

defining a primary initial lower multiplex level demand-route and a secondary initial lower level demand-route for each pair of nodes of said network according to a predetermined diversity policy, said primary and secondary initial lower multiplex level demand-route carrying all lower multiplex level demands originating or terminating at a node of said pair;

splitting the demand of each said primary and secondary initial lower multiplex level demand-route between an express demand and an overflow demand;

routing said express demands in higher multiplex level express routes between said pairs of nodes; and, patching said overflow demands into higher multiplex level routes according to a predetermined patching policy.

10. A method of routing lower multiplex level demands in a telecommunications network including a plurality of interconnected nodes to form higher multiplex level demand-routes, which comprises the computer implemented steps of:

creating an array of linked lists, said array comprising a linked list of demand-routes associated with each pair of nodes of said network;

creating a shortest route through said network between each pair of nodes of said network;

for each pair of nodes of said network, creating an initial lower multiplex level demand-route carrying all lower multiplex level demands originating or terminating at a node of said pair;

for each initial lower multiplex level demand-route:
splitting the demand of said initial lower multiplex level demand-route between an express demand and an overflow demand;
updating the linked list associated with the pair of nodes associated with said initial lower multiplex level demand-route with said express demand-route;
constructing an overflow route between the nodes of said pair according to a predetermined patching policy;

generating a list of overflow demand-routes carrying said overflow demand on said overflow route according to said patching policy;

updating the linked list associated each pair of nodes in said list of overflow demand-routes with each overflow demand-route of said list of overflow demand-routes.

11. The method as claimed in claim 10, wherein said updating steps each include the computer implemented steps of:

for a pair of nodes in said array of linked lists, determining whether the linked list for said pair of nodes includes as an element a route that is identical to said demand-route;

whenever said linked list includes as an element an identical route, adding the number of demands of said demand-route to said identical route; and, whenever said linked list does not include as an element an identical route, appending said demand-route to said linked list.

12. The method as claimed in claim 10, wherein said step of splitting the demand of said initial lower multiplex level demand-route includes the step of including a number of demands in each said express demand equal to an integer multiple of an express parameter.

13. The method as claimed in claim 10, wherein said step of splitting the demand of each said initial lower multiplex level demand-route includes the step of dividing said demand by an express parameter to obtain an integer multiple of said express parameter and a remainder.

14. The method as claimed in claim 13, including the step of including all of said demands in said express demand whenever said remainder is equal to or greater than a preselected threshold value.

15. The method as claimed in claim 13, including the step of including said remainder in said overflow demand whenever said remainder is less than a preselected threshold value.

16. A method of optimizing a telecommunications network, said telecommunications network comprising a plurality of interconnected nodes, which comprises the steps of:

(a) selecting a patching threshold value and a set of patching points in said network;

(b) defining an initial lower multiplex level demand-route for each pair of nodes in said network;

(c) splitting the demand of each initial lower multiplex level demand-route between an express demand and an overflow demand as a function of said selected patching threshold value;

(d) routing said express demands in first higher multiplex level express demand-routes;

(e) patching said overflow demands into first higher level demand-routes at patching points according to a predetermined patching policy;

(f) splitting the demand of each first higher multiplex level demand-route between a second higher multiplex level express demand and an overflow second higher multiplex level demand as a function of said selected patching threshold value;

(g) routing said second higher multiplex level express demands in second higher multiplex level express demand-routes;

(e) routing said second higher multiplex level overflow demands in second higher multiplex level overflow demand-routes;

(h) for each second higher multiplex level overflow demand-route, determining whether said second higher multiplex level overflow demand-route includes a patching subroute;

(i) for each patching subroute, finding a best bundle of second higher multiplex level overflow demand-routes that includes said patching subroute, said best bundle having a highest cost gradient between the sum of the costs associated with the demand-routes included in said best bundle and the total cost associated with said best bundle;

(j) bundling said second higher multiplex level overflow demand-routes according to said best bundles;

(k) adjusting the patching threshold value and the set of patching points in said network and repeating steps (b) through (j) until an optimum network configuration is found.

\* \* \* \* \*